J. TITUS.
Apparatus for Transmitting and Converting Motion.
No. 208,050. Patented Sept. 17, 1878.
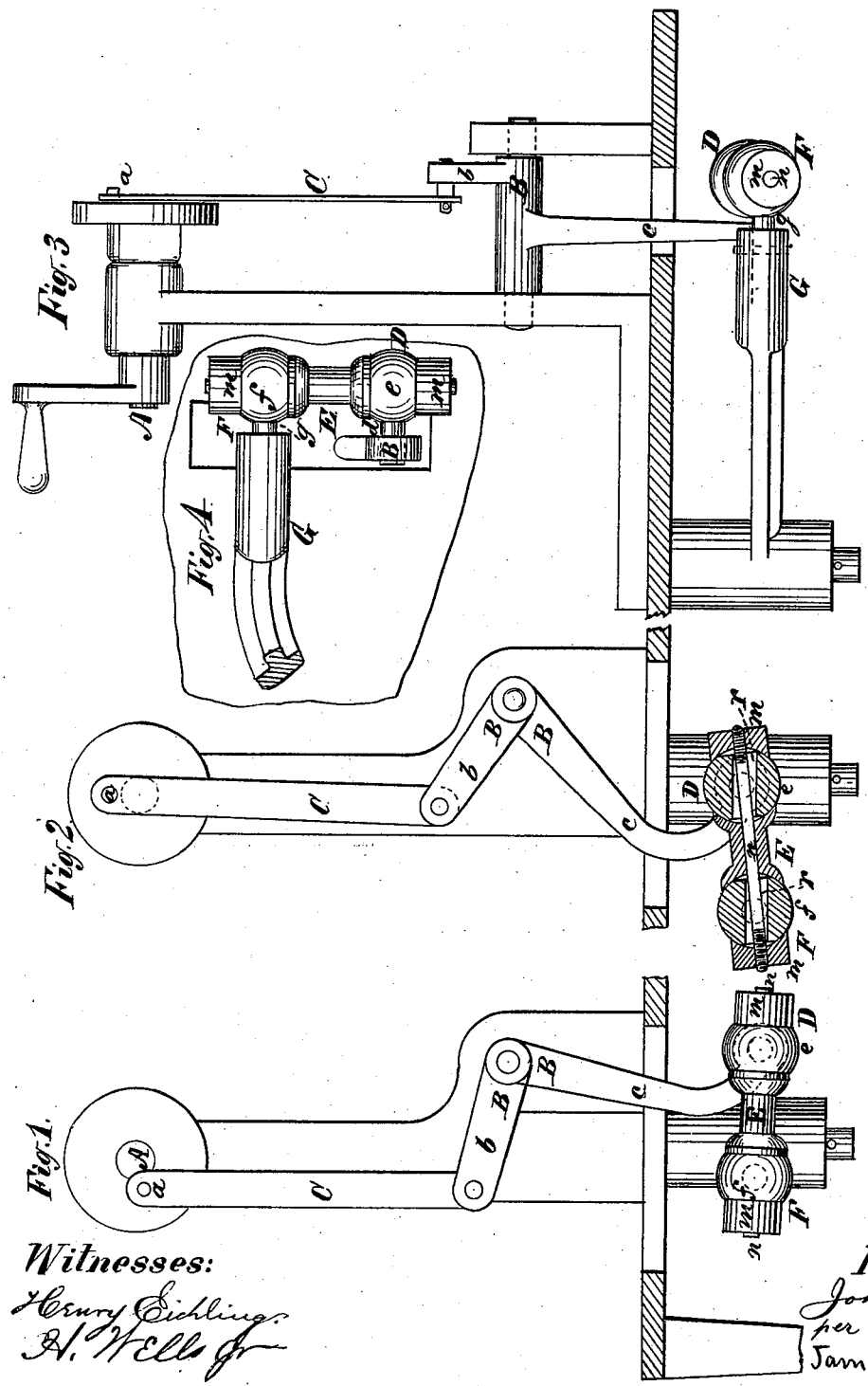
Witnesses:
Henry Eichling
H. Wells Jr
Inventor:
John Titus
per
James A Whitney
Atty.

UNITED STATES PATENT OFFICE.

JOHN TITUS, OF NORTH HEMPSTEAD, NEW YORK.

IMPROVEMENT IN APPARATUS FOR TRANSMITTING AND CONVERTING MOTION.

Specification forming part of Letters Patent No. 208,050, dated September 17, 1878; application filed July 3, 1878.

*To all whom it may concern:*

Be it known that I, JOHN TITUS, of North Hempstead, in the county of Queens and State of New York, have invented an Improvement in Means of Transmitting and Converting Motion, of which the following is a specification:

This invention comprises a novel combination of parts whereby the rotary motion of a revolving shaft is transmitted and converted into the vibratory motion of a pivoted arm or lever, the axis of vibration of which is at an angle to the axis of rotation of the shaft.

Figure 1 is a side view of an apparatus made according to my invention. Fig. 2 is a side view and partial section of the same. Fig. 3 is a side view of the same, taken at right angles to Figs. 1 and 2; and Fig. 4 is an inverted plan view, representing a portion of the same.

A is a shaft, arranged to rotate, and having at one end a crank-wrist, a. B is a bell-crank lever, one arm, b, of which connects, by a rod, C, with the crank-wrist a, while the other arm, c, connects, by a pivotal bearing, d, with the ball e of a ball-and-socket joint, D, at one end of a connecting-bar, E, which latter has at its opposite end another ball-and-socket joint, F, the ball f of which connects, by a pivotal bearing, g, with the movable extremity of a pivoted arm or lever, G.

The axis of movement or of vibration is, as will be seen from the drawings, at an angle to the longitudinal axis of the shaft A. The revolutions of the shaft A, being transmitted and transformed through the crank-wrist a, rod C, bell-crank lever B, and connecting-bar D, give vibratory movement to the arm or lever G, the universal joints of the connecting-bar E enabling the latter to change its position relatively to the arm c of the bell-crank lever and the vibratory arm or lever G in unison with the movements of said parts.

It should here be remarked that the ball-and-socket joints of the bar E may be most conveniently formed by causing the caps m of the sockets to be held in place by being screwed upon the threaded ends of a bolt, n, which is passed through a central longitudinal bore formed in the bar E and through slots or openings r formed through the balls, all as represented in Fig. 2.

What I claim as my invention is—

The herein-described combination of the crank-wrist a of the shaft A, the connecting-rod C, bell-crank lever B, connecting-bar E, having universal joints D F, and pivoted or vibratory arm or lever G, all substantially as and for the purpose set forth.

JOHN TITUS.

Witnesses:
H. WELLS, Jr.,
A. R. PAGE.